Oct. 4, 1938.   V. E. CARBONARA   2,132,286
CHANGE RESPONSIVE CONTROLLING MEANS
Original Filed June 14, 1932
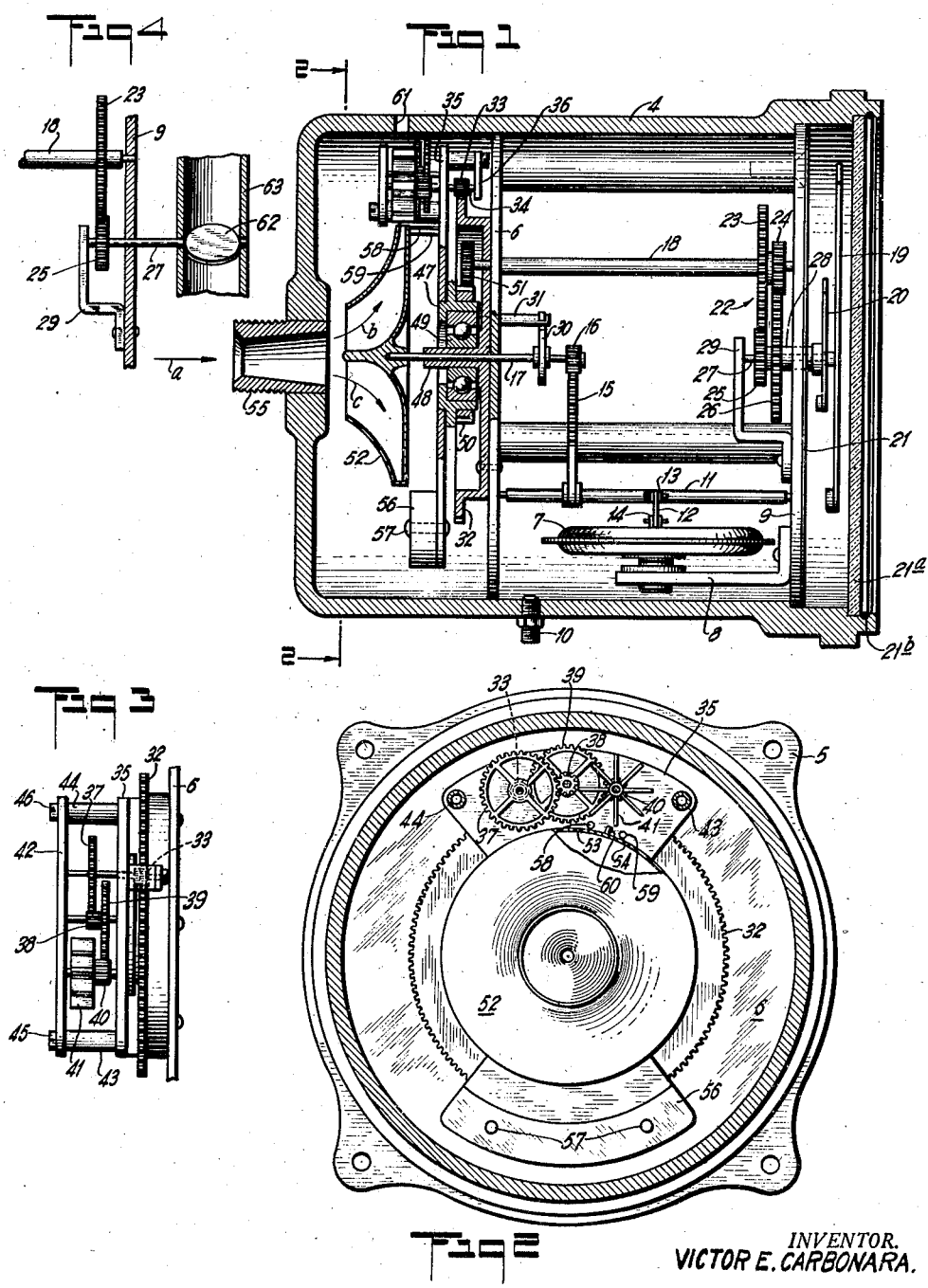
INVENTOR.
VICTOR E. CARBONARA.
BY Stephen Cerstvik.
ATTORNEY.

Patented Oct. 4, 1938

2,132,286

UNITED STATES PATENT OFFICE 2,132,286

CHANGE RESPONSIVE CONTROLLING MEANS

Victor E. Carbonara, Rockville Centre, N. Y., assignor to Bendix Aviation Corporation, South Bend, Ind., a corporation of Delaware Application June 14, 1932, Serial No. 617,226
Renewed April 27, 1937

24 Claims. (Cl. 73—151)

The present invention relates to change-responsive controlling means, and more particularly to indicating instruments and novel torque amplifying means therefor.

In many instances it is desirable to utilize an indicating instrument as a controlling element to cause the operation of auxiliary apparatus in accordance with and as a function of the changes in the conditions indicated by the instrument. For example, it may be desired to control a supercharger on an aircraft in accordance with changes in altitude, and to this end an altimeter is usually employed associated with the supercharger in such a manner that the pointer or pointer shaft of the altimeter is operatively connected to a controlling element of the supercharger for performing the desired function. Or, it may be desired to utilize a compass and/or a turn indicator as controlling elements in an automatic steering system for vehicles, such as aircraft or marine vessels, in the manner disclosed in a copending joint application of Adolf Urfer and Paul W. Koch, Serial No. 603,646, filed April 6, 1932.

It has been found however, that when an indicating instrument is employed in the manner set forth above, the power or torque available in the instrument (usually at the pointer or pointer shaft thereof) is inadequate to perform and completely effect the desired controlling action. Accordingly one of the objects of the present invention is to provide in an indicating instrument, novel means for increasing the power or torque available therein whereby said instrument may be employed as a controlling element in a control system operated by and in accordance with changes in conditions indicated by the instrument.

Another object is to provide novel torque amplifying means for indicating instruments whereby the torque or power at the indicating element, as for example at the pointer of the instrument, is substantially increased.

Still another object of the invention is to provide, in an instrument embodying an actuating element responsive to changes in conditions and an indicating element operated thereby, novel means whereby added power may be introduced into the instrument for amplifying the torque produced at the indicating element by the actuating element.

A still further object is to provide novel torque amplifying means embodying a structure which is relatively simple, yet extremely efficient and which may be embodied in various types of indicating instruments in order to obtain the desired controlling action from the latter.

The above and other objects and advantages of the invention will appear more fully hereinafter from a consideration of the detailed description which follows, taken together with the accompanying drawing wherein one embodiment of the invention is illustrated and applied to an instrument which indicates altitude for example. It is to be expressly understood however, that the drawing is only for the purpose of illustration and description and is not designed as a definition of the limits of the invention, reference being had for this purpose to the appended claims.

In the drawing wherein like reference characters refer to like parts throughout the several views, Fig. 1 is a longitudinal section through a casing of an instrument embodying one form of the present invention;

Fig. 2 is a cross section taken on line 2—2 of Fig. 1;

Fig. 3 is an enlarged detail view of a portion of the novel torque amplifying means of the invention as seen looking down from the top of the instrument shown in Fig. 1; and Fig. 4 is a detail view of a portion of one form of device embodying the invention and showing an application thereof to control an air supply.

In the illustrated embodiment, the torque amplifying mechanism of the invention is shown applied to an altimeter having a pressure responsive element which is actuated upon changes in barometric pressure to produce an indication by means of a plurality of pointers cooperating with their respective scales. The torque amplifying mechanism is interposed between the pressure responsive elements and the pointers, and includes means whereby power is introduced into the instrument from an external source and rendered effective upon actuation of the pressure-sensitive element to increase the torque at the pointer shaft or shafts.

In the form shown in the drawing, the instrument is constituted by a casing 4 of some suitable light weight material, such for example as cast aluminum or a phenol-condensation product, and is provided at the forward end thereof with ears or lugs 5 for mounting the instrument on an instrument panel. The interior of the casing is divided into rear and front compartments by means of a plate 6 which may be secured to the casing 4 in any suitable manner. In the front compartment, which is the one at the right as seen in Fig. 1, is mounted the actuating element of the instrument which is responsive to changes in conditions to be indicated by said instrument, together with the necessary gear train when two pointers are employed, one of which moves only a fraction of a revolution for a complete revolution of the other. In the form shown, the actuating element is constituted by an aneroid capsule 7 suitably supported on a bracket 8 carried by a plate 9 fixed within the instrument casing at the front end thereof. A nipple 10 is provided which communicates with the interior of the front compartment and which may be connected to a suitable point which is at static pressure, when the instrument is employed on aircraft where cockpit pressures are deleterious to the operation of instruments mounted on an instrument panel therein.

Means are provided for transmitting movements of the aneroid capsule 7 to an indicating element or elements to produce indications of such movements, and in the form shown said means comprise a rock shaft 11 which is journaled in the plates 6 and 9 and actuated by the aneroid capsule by means of a link 12, one end of which is pivotally secured to an arm 13 carried by the rock shaft and the other end of which is pivotally secured to a lug 14 carried by the pressure sensitive element 7. Secured to or formed integral with the rock shaft 11 is a gear sector 15 which meshes with a pinion 16 carried by a rotatable shaft 17 journaled in the plate 6, said shaft being adapted to be rotated in one direction or the other by the gear sector 15 and pinion 16 upon rocking movement of the rock shaft 11. The rotation of the shaft 17 is effective, through the novel torque amplifying means of the invention, to operate a second shaft 18, also journaled in the plates 6 and 9 for operating a pair of pointers 19 and 20 over suitable scales provided on a dial 21 through a reduction gear train 22 so that the pointer 20 moves only a fraction of a revolution for a complete revolution of the large pointer 19. The reduction gear train includes a relatively large pinion 23 and a relatively small pinion 24 secured to or formed integral with the shaft 18 and arranged to mesh with a relatively small gear 25 and a relatively large gear 26 respectively, the former being secured to a shaft 27 which carries the large pointer 19 and the latter gear being secured to a hollow shaft 28 which carries the small pointer 20 and through which the large pointer shaft 27 extends. The shaft 27 is journaled in a bracket 29 and also in the plate 9 while the hollow shaft 28 is concentric therewith. A hairspring 30 is provided for taking up the lost motion between the rotatable shaft 17 and the rock shaft 11 and has its inner end secured to the shaft 17 and its outer end fixed to a pin 31 carried by the plate 6.

A transparent member 21a of some suitable material, such as glass or unbreakable celluloid, is provided for covering the face of the instrument and is secured to the latter in any suitable manner, as for example, by means of a clamping ring 21b.

Novel means are now provided for introducing additional power into the instrument from an external source and for utilizing this power to amplify the torque or power available at the rotatable shaft 17 in order to increase the torque at the shafts 27 and 28 so that the latter may be employed effectively and efficiently as controlling elements for controlling auxiliary apparatus (Fig. 4) in accordance with the changes in conditions operating on the actuating element or aneroid capsule 7, in which event the pointers 19 and 20 may be dispensed with and the shafts 27 and 28 connected directly to certain elements of the auxiliary apparatus or in some cases the pointers 19 and 20 may themselves be utilized to control such auxiliary apparatus, or the instrument may be used simultaneously to indicate the changes in conditions and to control the auxiliary apparatus in accordance with such changes by merely interconnecting shaft 18 (Fig. 1) with the apparatus to be controlled, as will be apparent to those skilled in the art.

The novel mechanism is located in the rear compartment of the instrument casing and is carried by the plate 6 and, in the embodiment illustrated, is constituted by a planetary gear system arranged, preferably, concentrically with the rotatable shaft 17 and rendered effective upon rotation of the latter in one direction or the other. The planetary gear system includes a relatively large gear 32 which is secured to the plate 6 and therefore remains relatively stationary. Arranged to mesh with external gear 32 is a small pinion 33 secured to or formed integral with a shaft 34 journaled in a movable plate 35 and in a bracket 36 carried by said plate. Rotation of the pinion 33 is produced through a spur-gear train including a gear 37 which meshes with a pinion 38, the latter being driven simultaneously with a gear 39 which meshes with a pinion 40, the latter in turn being driven by an air impeller 41. The spur-gear train is mounted between the plate 35 and a plate 42, said plates being secured together in spaced relation by means of spacing rods 43 and 44 and screws 45 and 46. Secured to or formed integral with the plate 35 is a hub 47 which is journaled on a second hub 48, in any suitable manner, as by means of a ball bearing 49, said hub 48 being formed integral with the large external gear 32. Secured to the hub 47 is a sun gear 50 which meshes with a pinion 51 carried by the shaft 18.

It will now be seen that as the air impeller 41 is operated, in a manner to be described more fully hereinafter, it causes the pinion 40 to drive the gear 39, which in turn causes the pinion 38 to drive the gear 37 and hence the pinion 33 which is carried on the same shaft with said gear 37. Since the large external gear 32 is fixed to the plate 6, the rotation of the pinion 33 causes the entire plate 35 to revolve about the hub 48 on the ball bearing 49, thereby causing the sun gear 50 to drive the pinion 51 and hence the shaft 18, which then operates the pointers 19 and 20 through the gears 23, 24, 25 and 26.

Means are now provided whereby the air impeller 41 is operated upon rotation of the shaft 17 produced by a rocking movement of the rockshaft 11, and in the form shown comprise a distributor 52 having, in the present embodiment, the form of a frustum of a hollow cone, the base of which is closed except for a pair of apertures 53 and 54, said distributor being secured to and rotatable with the shaft 17 upon operation of the latter in order to cause one or the other of the apertures 53 and 54 to be lined up in such a position with respect to the impeller 41 that when air is introduced into the open end of the distributor through a nipple 55 provided in the rear wall of the casing 4, as indicated by the arrows a, b and c, the air escaping through the apertures 53 and 54 forms jets, one or the other of which drives the air impeller, depending upon which of the apertures 53 or 54 is in effective position to direct its jet against said impeller.

The plate 35 is in the form of a cross section of an hour glass and is provided at the lower enlarged end thereof with a counterweight 56 secured thereto in any suitable manner, as by means of rivets 57, in order to balance the weight of the spur-gear train about the axis of the shaft 17 and hub 48.

Means are also provided to prevent the distributor 52 from being actuated beyond a position wherein both orifices or jets 53 and 54 would be rendered ineffective if, for example, the distributor were rotated while the fluid pressure supply were, for some reason, temporarily cut off. In the form shown, said means comprise a pair of stops 58 and 59 carried on the upper enlarged portion of the plate 35 and a pin 60 cooperating with said stops and carried by the distributor on the periphery thereof, preferably, midway between the orifices or jets 53 and 54. Preferably, the distance between the orifices or jets 53 and 54 exceeds the diameter of impeller 41 by a very small amount so that the impeller normally lies between the paths of the jets when no change of the condition responsive means takes place, i. e., normally, the air issuing from the orifices or jets clears the impeller on both sides. If desired, however, the diameter of the impeller may be made slightly greater than the distance between the orifices or jets so that normally, the air issuing from the jets will simultaneously strike both sides of the impeller with equal force, thereby preventing rotation of the impeller; but when the distributor 52 is moved angularly, the air issuing from one of the jets will clear the impeller while the air from the other jet will cause the impeller to rotate.

It will be seen that the air distributor 52 causes the impeller 41 to rotate in such a direction that the planetary gear system will follow the distributor in exact synchronous angular motion, thereby driving the shaft 18 in synchronism with the motion of the distributor 52 but with a greater torque than is possible to obtain from the rotatable shaft 17, i. e. as the air distributor 52 is rotated in one direction or the other, one or the other of the jets 53 and 54 will be moved in position to operate the air impeller 41, thereby causing the latter to revolve about the fixed gear 32 in the same direction as the rotation of the distributor. The rate of the spur-gear train and the planetary gear system must be such that the final speed of rotation of the shaft 18 will be the same as that of the shaft 17 but it will be seen, however, that the torque on the shaft 18 will be amplified to a very great degree by the added power supplied to the system in the form of air pressure introduced into the rear compartment through the nipple 55. An aperture 61 is provided at the top of the rear compartment in order to permit the air introduced thereinto to escape therefrom. It will also be apparent that the supply of air introduced into the rear compartment through the nipple 55 may be provided by either connecting a pressure pump to said nipple to drive the air into the casing and exhausting it therefrom through the openings 61, or the opening 61 may be connected to a Venturi tube such as is available on aircraft, thereby causing air to be sucked in through the nipple 55 to operate the air impeller 41 upon actuation of the distributor 52.

In view of the fact that the interior of the rear compartment is subjected to air pressure it is desirable that plate 6 form an air tight seal with the casing 4 in order to prevent any appreciable leakage of air pressure from the rear compartment to the forward compartment so that the actuating element or aneroid capsule 7 will not be affected thereby.

Referring to Fig. 4 there is shown an application of the present invention for controlling a supply of air to a super-charger for example, and, for this purpose the control shaft 27 is connected to a butterfly valve 62 arranged to operate with an air duct or supply pipe 63 for varying the amount of air passing therethrough.

There is thus provided an indicating instrument embodying a novel torque amplifying mechanism for increasing the torque produced at the indicating element of the instrument by the actuating element thereof, whereby the instrument may be effectively employed to control auxiliary apparatus by and in accordance with the changes in conditions to which the instrument is responsive and which it is adapted to indicate.

Although only one embodiment of the invention has been illustrated and described, various changes and modifications, which will now appear to those skilled in the art, may be made in the form and relative arrangement of parts without departing from the scope of the invention. Reference is therefore to be had primarily to the appended claims for a definition of the limits of the invention.

What is claimed is:

1. The combination with a member adapted to be actuated and an actuating device therefor responsive to changes in conditions to produce a torque to be applied to said member, of fluid impact means effective upon operation of said actuating device for amplifying said torque, said means including a fluid operated impeller drivably connected to said member, a distributor operatively connected to the actuating device and arranged to direct a fluid stream against said impeller whereby the latter is rotated in one direction or another, and means for causing said impeller to revolve about the axis of the distributor in order to continually follow the latter in accordance with the operation of the actuating device.

2. In combination, a member adapted to be actuated, an actuating device responsive to changes in conditions for producing a torque to be applied to said member, and means for amplifying said torque, said torque amplifying means comprising a gear train operatively connected to said member, a fluid operated impeller for operating said gear train, rotatable means operatively connected to said actuating device for directing a fluid stream against said impeller to rotate the latter in one direction or another and effective upon operation of said actuating device, and means operated by said impeller whereby the latter is caused to revolve about the axis of said rotatable means.

3. In a control device, the combination of a rotary impeller adapted to be operated by fluid under pressure, an angularly movable distributor for directing fluid under pressure against said impeller, and means for causing said impeller to follow the angular movements of said distributor.

4. In a control device, the combination of a rotary impeller operated by fluid under pressure for rotation about its own axis and adapted to simultaneously revolve about a second axis parallel to said first axis, means angularly movable about said second axis for directing fluid under pressure against said impeller for operating the latter, and means for causing said impeller to follow the angular movements of said directing means about said second axis.

5. In control apparatus, the combination of angularly movable means for emitting fluid under pressure, a rotary impeller in the path of said fluid pressure emitting means and operated thereby, and means operated by said impeller for causing the latter to follow the angular movements of said fluid pressure emitting means.

6. In control apparatus, the combination of angularly movable means for emitting fluid under pressure, a rotary impeller in the path of said fluid pressure emitting means and operated thereby, means operated by said impeller for causing the latter to follow the angular movements of said fluid pressure emitting means, and means simultaneously operable with said last mentioned means for operating a device to be controlled.

7. In control apparatus, the combination of two angularly movable members, a source of power controlled by one of said members for operating the other member, means for causing the operated member to consonantly follow the angular movements of the power controlling member about the axis of the latter, and means operated by the follower member for operating a device to be controlled.

8. In apparatus of the class described, the combination of means responsive to changes in conditions, means to be operated in accordance with said changes in conditions, and torque amplifying means connecting said condition responsive means and said means to be operated, said torque amplifying means comprising a source of fluid under pressure, a rotary impeller adapted to be operated by said fluid under pressure and drivably connected to said means to be operated, angularly movable means for directing said fluid under pressure to said impeller and operatively connected to and controlled by said condition responsive means for controlling the operation of said impeller in accordance with said changes in conditions, and means for causing said rotary impeller to follow the angular movements of the fluid pressure directing means about the axis of the latter and for actuating the means to be operated.

9. In combination, a device responsive to changes in conditions or operations, a member to be operated in accordance with said changes in conditions or operations, and means connecting said member to said change responsive device for operating said member in accordance with said changes in conditions or operations and for amplifying the torque to be applied to said member, said last-named means comprising angularly movable power operated means drivably connected to said member, angularly movable power supplying means associated with said power operated means for operating the latter and operatively connected to and controlled by said condition responsive device for controlling said power operated means in accordance with said changes in conditions or operations, and means for causing said power operated means to consonantly follow the angular movements of said power supplying means about the axis of the latter.

10. In combination, a member adapted to be actuated, an actuating device responsive to changes in conditions for producing a torque to be applied to said member, and means for amplifying said torque, said torque amplifying means comprising a gear train operatively connected to said member, a fluid operated impeller for operating said gear train, rotatable means operatively connected to and controlled by said actuating device for directing a fluid stream against said impeller to rotate the latter in one direction or another, and gear means forming part of said gear train for causing said impeller to revolve about the axis of said directing means and to operate said member by said gear train.

11. In an altimeter, a rotatable shaft, a pointer connected to and operated by said shaft, a barometric pressure responsive device, an air driven reversible rotary impeller drivably connected to said rotatable shaft for operating said pointer, and means controlled by said barometric pressure responsive device for directing an air stream to said impeller so as to rotate the latter in one direction or another whereby said pointer is actuated correspondingly.

12. In an altimeter, a barometric pressure responsive device, a pointer, an air driven reversible rotary impeller operatively connected to said pointer for actuating the latter, means providing an air stream for driving the impeller, and means controlled by said barometric pressure responsive device for regulating the direction of said air stream to rotate the impeller in one direction or another whereby said pointer is actuated correspondingly.

13. In a pressure responsive indicating instrument, a rotatable shaft, an indicating element connected to and operated by said shaft, a pressure responsive device, an air driven reversible rotary impeller drivably connected to said rotatable shaft for operating said indicating element, and means controlled by said pressure responsive device for directing an air stream to said impeller to rotate the latter in one direction or another whereby said indicating element is actuated accordingly.

14. In an indicating instrument, a pressure responsive device, an indicating element, an air driven reversible rotary impeller operatively connected to said indicating element for actuating the latter, means providing an air stream for driving the impeller, and means controlled by said pressure responsive device for regulating the direction of said air stream to rotate the impeller in one direction or another whereby said indicating element is actuated correspondingly.

15. In an indicating instrument, an actuating device responsive to changes in conditions, an indicating element, an air driven reversible rotary impeller drivably connected to said indicating element for operating the latter, and means controlled by said condition responsive actuating device for directing an air stream to said impeller so as to rotate the latter in one direction or another whereby said indicating element is actuated correspondingly.

16. In an altimeter, the combination of an indicating member, a rotary impeller operatively connected to said indicating member for actuating the latter, means providing an air stream for rotating said impeller, and barometric pressure responsive means for regulating the direction of said air stream to rotate said impeller in one direction or another.

17. In an indicating instrument, the combination of an indicating member, a rotary impeller operatively connected to said indicating member for actuating the latter, means providing an air stream for rotating said impeller, and pressure responsive means for regulating the direction of said air stream to rotate said impeller in one direction or another.

18. In an indicating instrument, the combination of an indicating member, an air driven rotary impeller operatively connected to said indicating member for actuating the latter, means providing an air stream for driving said impeller, and means responsive to changes in conditions or operations for regulating the direction of said air stream to rotate said impeller in one direction or another.

19. In an indicating instrument, the combination of a casing, an indicating member, an air driven rotary impeller in said casing and operatively connected to said indicating member for actuating the latter, means for admitting air into the casing and providing an air stream for driving said impeller, and means responsive to changes in the factor to be indicated for regulating the direction of said air stream to rotate said impeller in one direction or another whereby said indicating member is actuated correspondingly.

20. In a measuring instrument, the combination of an indicating member, an air driven rotary impeller operatively connected to said indicating member for actuating the latter, movable means providing a laterally movable air stream for driving said impeller, and means responsive to changes in the conditions or operations to be measured for moving said last-named means.

21. In a measuring instrument, an actuating device responsive to changes in the conditions or operations to be measured, an indicating element, an air driven rotary impeller drivably connected to said indicating element for operating the latter, and movable means controlled by said condition responsive actuating device for changing the direction of an air stream to said impeller for rotating the latter to actuate said indicating element.

22. An indicating instrument for aircraft, comprising means responsive to changes in conditions or operations of said craft, an air turbine, air flow means adapted to drive said turbine in either direction, means actuated by said change responsive means governing said flow means to drive said turbine in a direction corresponding to the direction of movement of said change responsive means, and an indicator actuated by said turbine.

23. In combination, a member to be actuated in response to changes in conditions or operations, means automatically responsive to said changes in conditions or operations, and torque amplifying means for actuating said member in one direction or another with greater force than is available at said automatically responsive means, said torque amplifying means comprising a reversible rotary impeller, means providing a fluid stream for driving said impeller, and means controlled by said automatically responsive means for regulating the direction of said fluid stream to rotate said impeller in one direction or another, whereby the member to be actuated in response to the changes in conditions or operations is moved in proportion to the movement of the automatically responsive means.

24. In a measuring instrument for aircraft, the combination of an indicating member, and air driven rotary impeller operatively connected to said indicating member for actuating the latter, movable means providing an air stream for driving said impeller, and means responsive to changes in the conditions or operations for moving said last named means.

VICTOR E. CARBONARA.